United States Patent
Rodin

(10) Patent No.: US 6,739,097 B1
(45) Date of Patent: May 25, 2004

(54) FLOOR ELEMENT FOR A FLOOR HEATING OR COOLING SYSTEM, AND A PROCESS FOR MANUFACTURING THE ELEMENT

(76) Inventor: Håkan Rodin, Björn Barkmans väg 31, Ösmo (SE), S-148 32

(*) Notice: Subject to any disclaimer, the term of this patent is extended or adjusted under 35 U.S.C. 154(b) by 21 days.

(21) Appl. No.: 10/070,423
(22) PCT Filed: Sep. 15, 2000
(86) PCT No.: PCT/SE00/01789
§ 371 (c)(1), (2), (4) Date: Mar. 18, 2002
(87) PCT Pub. No.: WO01/20100
PCT Pub. Date: Mar. 22, 2001

(30) Foreign Application Priority Data

Sep. 17, 1999 (SE) .............................. 9903334

(51) Int. Cl.[7] .............................. F24D 19/02
(52) U.S. Cl. .................. 52/71; 52/746.1; 237/69; 165/56
(58) Field of Search ................ 52/71, 406.2, 631, 52/745.14, 746.1, 713, 800.11, 582.1; 237/69, 43; 165/56, 171, 49, 53

(56) References Cited

U.S. PATENT DOCUMENTS 6,270,016 B1 * 8/2001 Fiedrich ................ 237/69

FOREIGN PATENT DOCUMENTS

| EP | 0 854 325 | | 7/1998 | |
|---|---|---|---|---|
| EP | 854325 A2 | * | 7/1998 | ........... 237/69 |
| JP | 9060261 | * | 3/1997 | ........... 237/69 |
| SE | 457 810 | | 1/1989 | |
| SE | 468 057 | | 10/1992 | |

* cited by examiner

Primary Examiner—Carl D. Friedman
Assistant Examiner—Naoko N Slack
(74) Attorney, Agent, or Firm—Jacobson Holman PLLC

(57) ABSTRACT

An element, such as a floor element, for floor heating systems and the like, and a method of manufacturing such element. The element includes a sheet having at least one channel and a heat transfer layer which extends over one main surface of the sheet and on each side of respective channels, and forms an upwardly open recess that receives a heat transfer conductor and tightly embraces the conductor around half its circumference in the channel, with the upper side of the conductor being flush with or lower than the upper side of the sheet. The heat transfer layer is preferably made of thin, readily flexed foil that has a thickness of less than 200 μm.

8 Claims, 3 Drawing Sheets

FLOOR ELEMENT FOR A FLOOR HEATING OR COOLING SYSTEM, AND A PROCESS FOR MANUFACTURING THE ELEMENT

This is a nationalization of PCT/SE00/01789, filed Sep. 15, 2000 and published in English.

BACKGROUND OF THE INVENTION

1. Field of the Invention

The invention relates to a floor element for a floor heating or cooling system for mounting generally straight, parallel sections of a heat transporting conductor, the element including a sheet that has at least one channel and a layer of heat transfer material that extends over one main surface of the sheet and over each side of respective channels and that forms an upwardly open recess which receives a heat transfer conductor, wherein the upper side of the conductor lies flush with or lower than the upper side of the sheet, and wherein the channels extend completely through the thickness of the sheet. The invention also relates to a process of manufacturing the floor element, for generally straight, parallel sections of a heat transporting conductor.

The inventive floor element thus functions to define a locating path that provides the correct mutual spacing between different parts of a conductor loop that is adapted to deliver heat to the room and to receive heat therefrom respectively. The conductor may, for instance, be a heat-emitting electric cable or a pipe that conveys hot or cold fluid. The floor element is coated with a layer of heat-distributing material, with the intention of achieving essentially uniform distribution of the heating/cooling effect over the surface area of the floor.

However, the invention will be described below primarily with reference to a so-called heated floor, although it will be readily understood that the floor system can be used equally as well for cooling purposes.

2. Description of the Related Art

SE-B468 057 teaches a floor element for floor heating systems. The floor element includes an aluminium plate which is bent to form a plurality of mutually spaced and mutually parallel U-shaped, outwardly open channels/holders for a heat-emitting conductor. The plate is supported by a carrying sheet that has mutually parallel, through-extending slits that receive bent portions of the plate. The sheet, or more specifically ribs, that supports, support, the plate between the bent or folded portions of the plate is are connected to the plate. The floor element is fixed to the sub-floor.

The known floor element has several drawbacks. For instance, the plate is thick and rigid, so as to sustain the physical dimensions of the floor element. Because the plate is rigid, it is not possible to lay a clinker floor directly on or in the proximity of the aluminium plate of said element, in view of the risk of the clinker tiles cracking or loosening as a result of thermal stresses. The cost of laying a further covering layer on such floor elements is an onerous expense. Furthermore, the plate is expensive as a result of its necessary thickness. Cutting of the floor element is also a troublesome procedure, because of the thickness of the plate. Moreover, the plate is relatively heavy and demands a high cost.

SUMMARY OF THE INVENTION

The object of the present invention is to provide a floor element with which at least one of the aforesaid problems is eliminated either completely or partially. A further object of the invention is to provide a floor element whose width can be minimised, for instance during its transportation, and which provides a predetermined maximum width with respect to said channels in maximising the width of the floor element. Another object is to provide a favourable method of producing such elements. These objects are achieved with the floor element for mounting generally straight, parallel sections of a heat transporting conductor, such element including a sheet that has at least one channel and a layer of heat transfer material that extends over one main surface of the sheet and over each side of respective channels and that forms an upwardly open recess which receives a heat transfer conductor. The upper side of the conductor lies flush with or lower than the upper side of the sheet, and the channels extend completely through the thickness of the sheet. The heat transfer material is comprised of a thin, readily flexed foil that has a thickness of less than 200 $\mu$m, and the second main surface of the sheet is provided with one or more other foils which mutually hold together adjacent sheet parts defined by the channels and which define a maximum distance between said sheet portions corresponding to the diameter of the conductor.

According to a further embodiment, the mounting element includes a lateral slit that extends through the mounting element from the second main surface of the sheet up to the first main surface of the sheet, but not through the heat transfer layer which forms a hinge means between the two mutually foldable parts of the mounting element formed by the slit, such that the mounting element is folded double at the slit for transport purposes.

According to another embodiment of the present invention, the other foils are flexible, allowing the element to be pressed laterally into abutment between the adjacent sheet parts that define said channels, for transportation purposes. Pieces of connecting tape are placed on the second main surface so as to bridge the butt loins and therewith stabilise the mounting element.

A method of producing the floor element is by disposing a group of separate, parallel sheet portions that are mutually parallel and spaced at a chosen distance apart in one plane, fixing a stretched flat foil of heat transferring material on one main surface of the group of sheet portions, subsequently reducing the distance between the sheet portions to a chosen value, and applying a piece of holding foil on the opposite main surface of the group to define a corresponding maximum channel width in the mounting element. The width of the heat transfer layer between mutually adjacent sheet portions is chosen to allow the heat transfer layer to extend essentially around half the circumference of a conductor placed in the channel at the same time as the conductor is accommodated between both main surfaces of the element.

The method may further include cutting through the element from one main surface provided with the holding foil, up to the heat transfer foil and then folding the element double at the cut such that the heat transfer foil forms a hinge means.

Additionally, the method may include the step of applying the flexible holding foils and then bringing the sheet portions generally into abutment with one another, and applying pieces of connecting tape to the other main surface of the group of sheet portions so as to stabilise the element, and cutting the pieces of connecting tape prior to mounting the heat transporting conductor in the mounting element.

A method of producing the floor element is set forth in the independent method Claim.

Further embodiments of the invention will be evident from the accompanying dependent Claims.

The inventive floor element can be considered to have a basic structure of the kind disclosed in SE-B468 057, although with the exception that instead of using a relatively thick and rigid aluminium plate as in the solution taught by SE-B468 057, it is proposed in accordance with the invention that the heat-distributing layer of material shall consist of a readily flexible foil that has a thickness of less than 200 μm.

By ensuring that the heat-emitting foil has an adapted free width between mutually adjacent strip-like parts of the sheet supporting the floor element, it is possible to press the heat transferring conductor down between said strips, and to enable the strips to be pressed against opposing sides of the conductor via the aluminium foil, said foil embracing generally half the circumference of the conductor, and said conductor being received between both main surfaces of the sheet. The sheet portions can be fixed mutually either before or after having clamped the conductor.

The use of a relatively thin and easily flexed aluminium foil in accordance with the invention enables the size of the floor element to be readily adapted, by cutting the foil in the channel defined by respective strip-like portions. The slit or channel width can be easily reduced.

The inventive element can be stored and delivered in two different configurations.

In one configuration, the strip-like portions of the supporting sheet may be pressed tightly together laterally and the foil surplus in the slits or channel placed in the join gap or laid flat on one main surface of the sheet. Pieces of adhesive tape may be stuck over the strip joins on the opposite side of the sheet, so as to impart flexural rigidity to the floor element in one direction about a longitudinally extending line. The sheet may also be divided conveniently in its longitudinal centre region by a cut that extends transversely over the longitudinal axis of the strip-like portions, this cut penetrating the sheet to the vicinity of the heat transfer foil which then forms a hinge means about which the sheet can be folded double, said double-folded sheet then forming a unit of sufficient rigidity for handling purposes, due to the aforesaid pieces of adhesive tape. The floor element can be readily arranged for placement on a supportive surface, by first unfolding the element about the hinge means and then cutting through the adhesive tapes at the strip joins.

The generally U-shaped and longitudinally extending channels in the sheet elements that receive the bends of the conductors may be pre-formed in a corresponding floor plate that is provided on its underside with adhesive tape or foil that holds together those parts of the plate that are separated by the channels/conductor slits. A heat conducting foil, for instance aluminium foil, may cover the upper surface of the floor plate, preferably completely.

The floor element normally receives mutually parallel, longitudinal sections of a, e.g., meandering conductor, wherein the conductor sections curved through 180° are received in the U-shaped channels in said floor plate. The floor plate and the floor element may be joined together heat-wise, by applying a heat transfer foil that bridges the heat transfer foils of the plate and said element. The floor plate can be formed by using a sheet-blank that consists of a rectangular sheet of plastic foam that is provided on one side with (plastic) foil and on the other main surface with a heat transfer foil, for instance AL-foil. A hot punch corresponding to the channelling required for the curved conductor sections is pressed on the AL-foil side down to the plastic foil, which is suitably heat-resistant, therewith forming channels in the plastic foam for receiving the conductor. The AL-foil may be caused to break roughly at the inner radius of the channelling, wherein the AL-foil is folded down against the outer radius side of the channel. When wishing to reinforce or enhance the transfer of heat, an additional AL-foil can be applied in and along the channel region. However, it is normally sufficient to generally convey heat to those parts of the AL-foil on the plate that lie on the outer radius side of the channel. The flat portions that are separated by the channels are physically held together by the plastic foil.

BRIEF DESCRIPTION OF THE DRAWINGS

The invention will now be described in more detail by way of example with reference to the accompanying drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
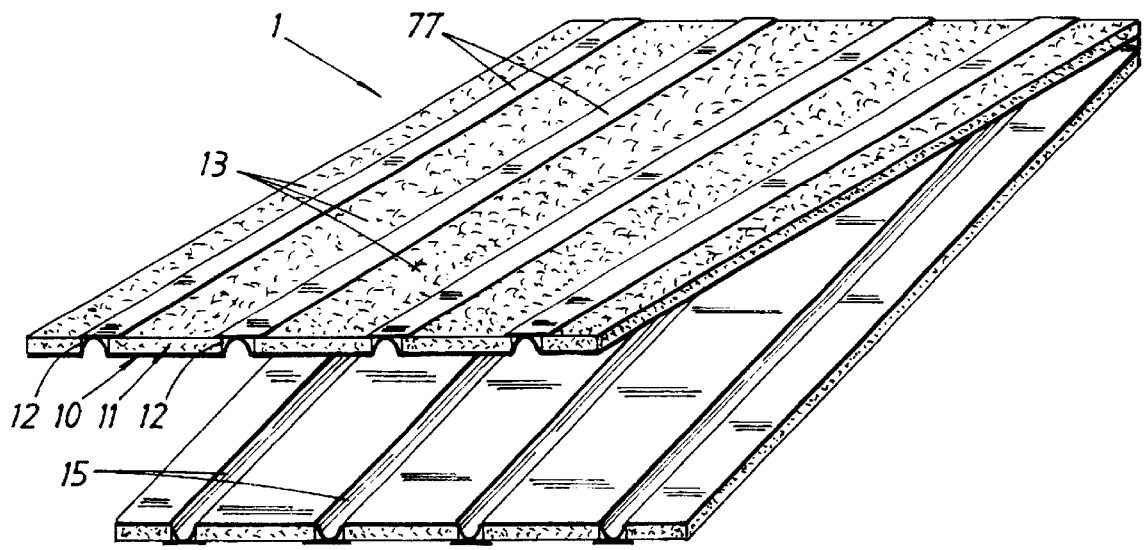
FIG. 1 is a schematic and perspective illustration of a first embodiment of an inventive floor element.

FIG. 1 shows an inventive floor element essentially in a transportation state. When in use, the element 1 has a generally flat, rectangular shape and is comprised of a thin aluminium foil 10 of corresponding size and a thickness that is less than 200 μm, preferably a thickness of 100 μm.

The foil 10 is carried by a floor sheet 11, e.g. a cellular sheet, particle board, plaster board, or a technical equivalent. The sheet 11 includes through-extending, mutually parallel slits 12, which are also parallel with the longitudinal edges of the sheet 11. The slits divide the sheet 11 into mutually parallel, longitudinally extending strips 13, wherewith the side strips of the sheet suitably have a width corresponding to half the width of the inwardly lying strips.

The slits 12 are bridged by foil portions 15 whose width is adapted to the thickness of the sheet 11 and to the outer diameter of the conductor to be placed in the foil portions or sections 15, such that the foil 15 will tightly embrace the bottom half of the conductor circumference and to enable the conductor to be placed between the top and bottom main surfaces of the sheet.

As evident from FIG. 1, the sheet 11 may include a through-extending transversal slit 16 in the longitudinal centre region of the sheet, wherewith the connecting foil portions 17 forms a hinge means for both parts of the floor element.

The gap between the strips 13 is bridged on the rear side of the sheet with a two-way tape reinforcement 77 or some corresponding device, wherein said tapes 77 define a maximum distance between the strips 13 to which the foil width 15 is well-adapted to embrace a pipe/a conductor whose diameter corresponds to the greatest width between the strips 13. It is, of course, possible to mount a fully covering foil on the underside of the sheet as an alternative to adhesive tape 77 at the gap between each pair of strips 13.

The adhesive tapes 77 shall suitably have such flexibility as to enable the width of the element to be minimised, by bringing the side edges of mutually adjacent strips 13 together, for instance during transportation.

After having folded out the element 1 shown in FIG. 1, said element can be placed in a correct position on a sub-floor and the sheet parts 13 fixed to said floor with centrally stretched adhesive tapes 77. A heating cable/heating conductor/cooling conductor can now be readily pressed down correctly into the channels that are exposed when the spacing holders are removed.

Figure 2:
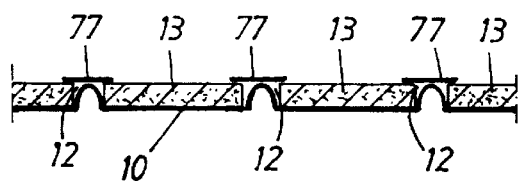
FIG. 2 is a cross-sectional view of the subject of FIG. 1.
Figure 3:
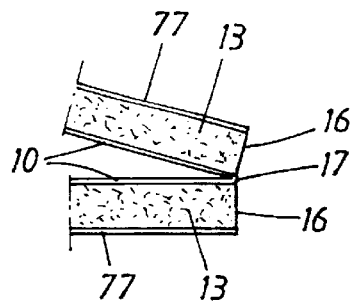
FIG. 3 illustrates part of the element shown in FIG. 1.

As will be evident from FIG. 2, the adhesive tapes 77 can be replaced with adhesive foil that covers the corresponding main surface of the floor element. Naturally, it is necessary to slit the foil at the hinge join 16, 17.

Figure 4:
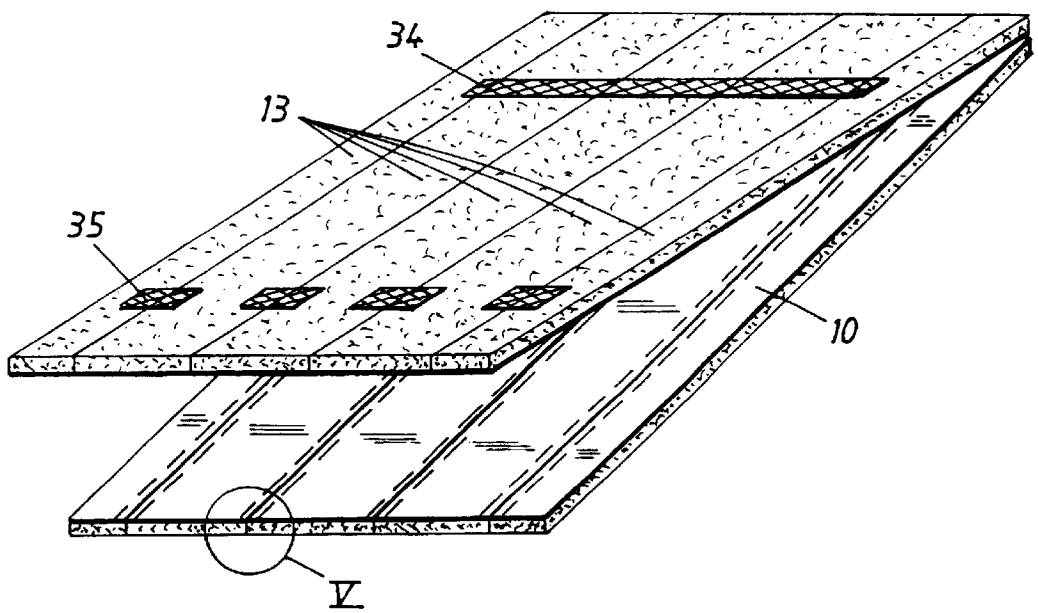
FIG. 4 illustrates another embodiment of the floor element.
Figure 5:
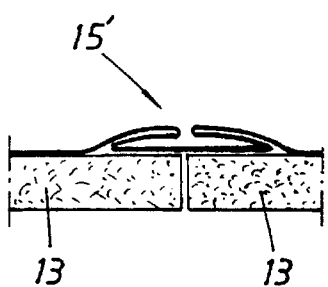
FIG. 5 is a cross-sectional view of the part V in FIG. 4.

FIGS. 4 and 5 illustrate an embodiment in which the foil portions 15 are folded together and laid flat on one main surface of the sheet 11, whereas the strips 13 on the sheet are brought laterally into contact with each other. A rigid element transportation state is achieved with the aid of pieces of adhesive tape 34, 35 that bridge the channels 12 on the main surface distal from the AL-foil, said channels 12 being eliminated by pressing the strips against one another, and by folding the element double about a transversal slit located at half the length of the sheet for instance, although not penetrating the AL-foil 10. After folding out the sheet 1 about the hinge means 16, 17 and cutting through the tapes 34, 35 at the location of the channels 12, the sheet can be placed on a supportive surface and the strips mutually separated to open the channels 12, wherewith the conductor can be developed and the foil portion 15 pressed down into the channelling.

Figure 7:
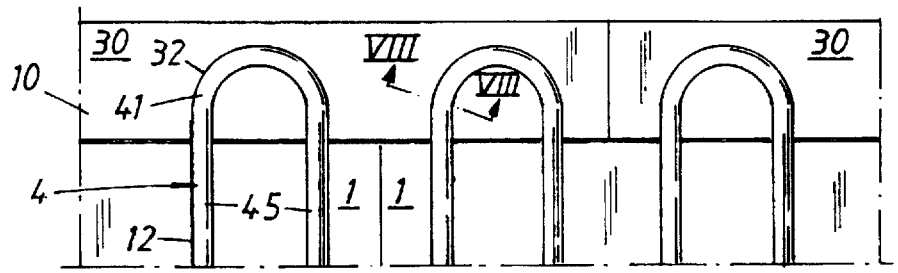
FIG. 7 is a schematic plan view of a heated floor under construction with the aid of floor elements and floor plates according to the invention.
Figure 8:
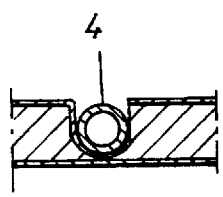
FIG. 8 is a sectional view taken on the line VIII—VIII in FIG. 7.

As will be evident from FIGS. 7 and 8, the conductor 4 is normally laid in a meandering fashion, wherewith mutually adjacent, straight and parallel conductor sections 45 are placed in mutually adjacent, corresponding foil-clad channels in the element 1. The curves or bends 41 of the conductor 4 are also placed in the channels 32 in the plate 30. It will be seen from FIG. 7 that the channels 32 are generally semicircular in shape, so that the ends of the channel 32 connect with adjacent channels 12 in the sheet 1.

Although the invention has been described above with reference to a floor structure for the sake of simplicity, it will be obvious that the invention is not limited to this particular application, but can also be applied with the use of the inventive element and inventive plate on wall surfaces, ceiling surfaces and other surfaces with the intention of delivering heat or of removing heat from said structures.

Figure 6:
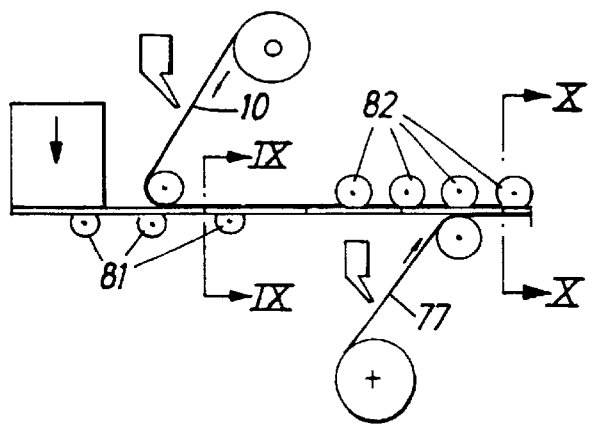
FIG. 6 illustrates schematically apparatus for producing a floor element according to FIG. 1.
Figure 9:
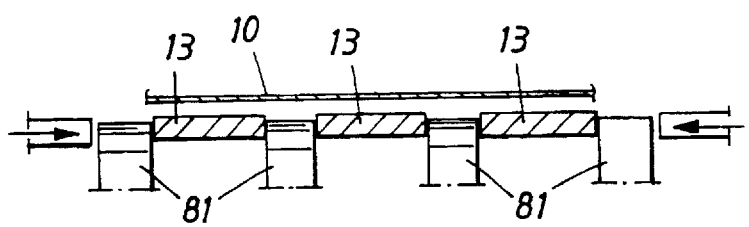
FIG. 9 is a view taken on the line IX—IX in FIG. 6.
Figure 10:
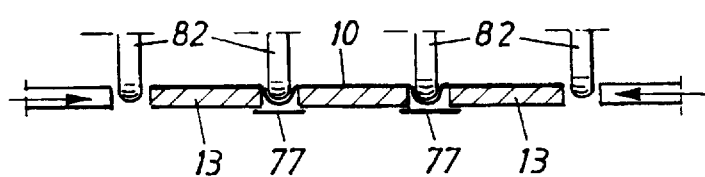
FIG. 10 is a view taken on the line X—X in FIG. 6.

FIGS. 6, 9 and 10 show that the sheet 1 of FIG. 1 can be produced by advancing arrays of laterally spaced lamellae along a feed path, wherein the lamellae are spaced mutually apart (FIG. 9) with the aid of spacer elements 81 in a first part of said path. In the illustrated case, said spacer elements 81 have the form of wheels of specific width, wherewith a flat AL-foil 10 is adhered to one main surface. The lamellae 13 are then brought together laterally to a smaller distance apart with the aid of spacing elements 82, which in the illustrated case have the form of wheels that also function to press the aluminium foil down into the channels, whereafter pieces of flat adhesive tape 77 are applied to opposite sides of the strips 13 across the channels 12, so as to define a largest channel width that corresponds to the diameter of the conductor. The first mentioned width of the channels is chosen to enable the conductor to be embraced around half its circumference by the AL-foil, while providing room for the conductor between the main surfaces of the sheet at the same time.

In the case of straight channels that lack heat conducting foil but where such foil is desired, a conductive tape can, in principle, be produced in accordance with FIG. 5, detail 15'. The tape can be obtained either with adhesive and a paper backing, or solely with adhesive on the whole or parts of the underside of the formed foil, preferably on the two edge portions outwardly of the folded region. The double-folded part will be smaller than the nose width and can thus be used particularly easily. The conductive tape will automatically assume a U-shape and embrace the conductor at least around half its circumference, as the conductor is pressed or trod down into the channel.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A mounting element for mounting generally straight, parallel sections of a heat transporting conductor, said element comprising a sheet that has at least one channel and a layer of heat transfer material that extends over a first main surface of the sheet and over each side of respective channels and that forms an upwardly open recess which receives a heat transfer conductor an upper side of the conductor lying flush with or lower than said first main surface of the sheet, said channels extending completely through the thickness of the sheet, said layer of heat transfer material including a thin, readily flexed foil that has a thickness of less than 200 $\mu$m, and a second main surface of said sheet being provided with one or more other flexible foils which mutually hold together adjacent sheet portions defined by said channels and which define a maximum distance between said sheet portions corresponding to a diameter of the conductors, the flexibility of said heat transfer material and said other foils permitting said element to be pressed laterally to bring into abutment adjacent sheet portions that define said channels.

2. The mounting element according to claim 1, wherein a lateral slit extends through the mounting element from the second main surface of the sheet up to said heat transfer layer of said first main surface of said sheet to form two mutually foldable parts with the heat transfer layer forming a hinge therebetween, said mounting element being folded double at said slit for transport purposes.

3. The mounting element according to claim 1, wherein, when said element is pressed laterally to bring adjacent sheet portions into abutment, pieces of connecting tape are placed on the second main surface so as to bridge joints between the abutting adjacent sheet portions and therewith stabilise the mounting element.

4. A method of manufacturing a mounting element for generally straight, parallel sections of a heat transporting conductor, comprising the steps of:
- disposing a group of separate, parallel sheet portions with said portions mutually parallel and spaced at a chosen distance apart in one plane;
- fixing a stretched-flat flexible foil of heat transferring material as a heat transfer layer on a first main surface of said group of sheet portions, and subsequently reducing the distance between said sheet portions to a chosen width;
- applying a piece of flexible holding foil on a second opposite main surface of said group of sheet portions to define a corresponding maximum channel width in said mounting element, the width of a channel formed by the heat transfer layer between mutually adjacent sheet portions being chosen to allow the heat transfer layer to extend essentially around half a circumference of a heat transporting conductor placed in the channel when the conductor is accommodated between both main surfaces of said element.

5. The method according to claim 4, further comprising cutting through the element from said second main surface provided with said holding foil, up to said heat transfer layer and folding said element double at the cut such that the heat transfer layer forms a hinge.

6. The method according to claim 4, further comprising the steps of applying said flexible holding foils and then bringing the sheet portions generally into abutment with one another, and applying pieces of connecting tape to the second main surface of said group of sheet portions so as to stabilise the element, and cutting said pieces of connecting tape prior to mounting the heat transporting conductor in said mounting element.

7. A mounting element for mounting generally straight, parallel sections of a heat transporting conductor, comprising a sheet having at least one channel and a layer of heat transfer material that extends over a first main surface of the sheet and over each side of respective channels and that forms an upwardly open recess which receives a heat transfer conductor, an upper side of the conductor lying flush with or lower than said first main surface of the sheet, and the channels extending completely through the thickness of the sheet, said layer of heat transfer material including a thin, readily flexed foil and said second main surface of said sheet being provided with one or more other foils which mutually hold together adjacent sheet portions defined by said channels and which define a maximum distance between said sheet portions corresponding to the diameter of the conductor, a lateral slit extending through the mounting element from the second main surface of the sheet up to said layer of heat transfer material on said first main surface of said sheet to form two mutually foldable parts, with the layer of heat transfer material forming a hinge therebetween, such that said mounting element can be folded double at said slit.

8. The mounting element according to claim 7, wherein said other foils are flexible such that said element may be pressed laterally to bring into abutment adjacent sheet portions that define said channels, with pieces of connecting tape being placed on the second main surface so as to bridge joints between the abutting adjacent sheet portions and therewith stabilise the mounting element.

* * * * *